US 6,745,324 B1

(12) United States Patent
Skazinski et al.

(10) Patent No.: US 6,745,324 B1
(45) Date of Patent: Jun. 1, 2004

(54) DYNAMIC FIRMWARE IMAGE CREATION FROM AN OBJECT FILE STORED IN A RESERVED AREA OF A DATA STORAGE DEVICE OF A REDUNDANT ARRAY OF INDEPENDENT DISKS (RAID) SYSTEM

(75) Inventors: Joseph G. Skazinski, Berthoud, CO (US); Noel S. Otterness, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 09/715,689

(22) Filed: Nov. 16, 2000

(51) Int. Cl.⁷ .......................... G06F 9/445; G06F 11/00
(52) U.S. Cl. ..................... 713/2; 714/6; 714/7
(58) Field of Search .................. 713/2, 1; 714/6, 714/7, 710

(56) References Cited

U.S. PATENT DOCUMENTS

| 5,303,380 A | * | 4/1994 | Tenny et al. ................. 717/162 |
| 5,325,532 A | | 6/1994 | Crosswy et al. ............ 395/700 |
| 5,933,631 A | | 8/1999 | Mealey et al. .............. 395/652 |
| 5,933,652 A | | 8/1999 | Chen et al. ................. 395/821 |
| 5,948,101 A | | 9/1999 | David et al. .................... 713/2 |
| 6,009,497 A | | 12/1999 | Wells et al. ................. 711/103 |
| 6,370,645 B1 | * | 4/2002 | Lee ................................. 713/2 |
| 6,381,693 B2 | * | 4/2002 | Fish et al. ...................... 713/1 |
| 6,401,201 B2 | * | 6/2002 | Fish et al. ...................... 713/2 |

FOREIGN PATENT DOCUMENTS

| JP | 08190462 A | 7/1996 | ............ G06F/3/06 |
| JP | 08190463 A | 7/1996 | ............ G06F/3/06 |
| JP | 09101887 A | 4/1997 | ............ G06F/9/24 |
| JP | 10260788 A | 9/1998 | ............ G06F/3/06 |
| JP | 2002318666 A | * 10/2002 | ............ G06F/3/06 |

OTHER PUBLICATIONS

IBM, Read Look Ahead on Non–Read Command, Nov. 1, 1996, vol. 39, Issue 11, pp. 131–132.*
Patterson et al., "A Case for Redundant Arrays of Inexpensive Disks (RAID)," Computer Science Division, U.C. Berkeley, pp. 1–24.

* cited by examiner

Primary Examiner—Dennis M. Butler
Assistant Examiner—Suresh K Suryawanshi
(74) Attorney, Agent, or Firm—R. Michael Ananian; Arthur J. Samodovitz

(57) ABSTRACT

A method and apparatus are provided for dynamically creating an executable image from an Object File Format (OFF) file stored in a reserved area 175 of one of a plurality of data storage devices 125 in a memory system 100. In the method, a controller 105 having a Programable Read Only Memory (PROM) 160, Random Access Memory (RAM) 155 and a Central Processing Unit (CPU) 150 is coupled to the plurality of data storage devices 125. The memory system 100 is initialized using an initial boot sequence stored in the PROM 160. This initialization can include a hardware discovery sequence to identify all hardware present in the memory system 100. Data relating to the discovered hardware is read from the OFF file and translated from an object format into an executable image that is assembled in RAM 155. Optionally, the PROM 160 is an Electronically Erasable PROM (EEPROM) and the assembled executable image is stored in the EEPROM replacing the initial boot sequence.

4 Claims, 3 Drawing Sheets

DYNAMIC FIRMWARE IMAGE CREATION FROM AN OBJECT FILE STORED IN A RESERVED AREA OF A DATA STORAGE DEVICE OF A REDUNDANT ARRAY OF INDEPENDENT DISKS (RAID) SYSTEM

FIELD OF THE INVENTION

The present invention relates generally to memory systems, and more particularly to an apparatus and method that can dynamically create an executable image from an object file stored in a reserved area of a data storage device of a memory system including a Redundant Array of Independent Disks (RAID) system.

BACKGROUND OF THE INVENTION

Modern computer networks frequently require large, fault-tolerant memory systems. One approach to meeting this need is to provide a RAID system having a number of hard disk drives operated by a controller that is coupled to a host computer. RAID systems improve storage reliability, availability and system performance by providing storage capacities larger than any single data storage device. This larger storage capacity enables more data to be stored and accessed more rapidly. In addition, the larger storage capacity improves reliability by providing redundancy and allowing storage of parity and/or error checking bits.

RAID systems can be configured to store the data in numerous alternative ways commonly referred to as RAID levels. There are six basic RAID levels, each possessing different advantages and disadvantages. These levels are described in, for example, an article titled "A Case for Redundant Arrays of Inexpensive Disks (RAID)" by David A. Patterson, Garth Gibson and Randy H. Katz; University of California Report No. UCB/CSD 87/391, December 1987, which is incorporated herein by reference. RAID level 2 uses non-standard disks and as such is not normally commercially feasible.

RAID level 0 employs "striping", where the data is broken into a number of stripes which are stored across the disks in the array. This technique provides higher performance in accessing the data but provides no redundancy which is needed in the event of a disk failure.

RAID level 1 employs "mirroring", where each unit of data is duplicated or "mirrored" onto another disk drive. Mirroring requires two or more disk drives. For read operations, this technique is advantageous since the read operations can be performed in parallel. A drawback with mirroring is that it achieves a storage efficiency of only 50%.

In RAID level 3, a data block is partitioned into stripes which are striped across a set of drives. A separate parity drive is used to store the parity bytes associated with the data block. The parity is used for data redundancy. Data can be regenerated when there is a single drive failure from the data on the remaining drives and the parity drive. This type of data management is advantageous since it requires less space than mirroring and only a single parity drive. In addition, the data is accessed in parallel from each drive which is beneficial for large file transfers. However, performance is poor for high input/output request (I/O) transaction applications since it requires access to each drive in the array.

In RAID level 4, an entire data block is written to a disk drive. Parity for each data block is stored on a single parity drive. Since each disk is accessed independently, this technique is beneficial for high I/O transaction applications. A drawback with this technique is the single parity disk which becomes a bottleneck since the single parity drive needs to be accessed for each write operation. This is especially burdensome when there are a number of small I/O operations scattered randomly across the disks in the array.

In RAID level 5, a data block is partitioned into stripes which are striped across the disk drives. Parity for the data blocks is distributed across the drives thereby reducing the bottleneck inherent to level 4 which stores the parity on a single disk drive. This technique offers fast throughput for small data files but performs poorly for large data files. Other somewhat non-standard RAID levels or configurations have been proposed and are in use. Some of these combine features of RAID configuration levels already described.

The controller provides the brains of the memory system, coordinating the operation of the disk drives to perform read and write functions, parity generation and checking, and handling drive failures without interrupting host requests. To provide this functionality utilizing minimal host processor time and without modifying user applications the controller typically includes a processor or Central Processing Unit (CPU), Random Access Memory (RAM) and a Programable Read Only Memory (PROM). In addition, the controller also includes firmware or microcode whose primary purpose is to initialize the memory system when it is first turned on. The process of initializing the memory system is commonly referred to as "booting", the system. Firmware is essentially a series of machine instructions stored in the PROM or other non-volatile memory. After power to the controller is turned on, the CPU begins to execute the firmware instructions and initialize the memory system. Thereafter, the controller functions to allow other operations to be performed, i.e., enables a host computer to write data to and read data from the memory system.

One problem or limitation encountered in the design of RAID systems concerns problems with the controller firmware. Basically, if the controller firmware has any program errors or if the components or configuration (RAID level) of the memory system needs to be changed, the firmware stored in the PROM must be upgraded, namely, replaced by another program without the problems or errors. Traditionally, this involved removing the existing PROM from the controller and replacing it with a new PROM pre-programmed with the corrected or upgraded programs. The latest generation of controllers uses Electronically Erasable PROM (EEPROM), also known as Flash EPROM, that along with utility programs on an attached host computer, allow the EEPROM to be erased and reprogrammed in-situ with new firmware downloaded via a host interface.

Significant problems remain, however, in that the above procedure typically requires that a user stop or shut down the controller prior to upgrading the firmware. This involves finishing or aborting all pending requests for data input/output, flushing the RAM, stopping background activities (such as Battery Back-up Unit monitoring, enclosure monitoring, and other periodic processes) and performing no host interrupts. After the firmware upgrade procedure, it is necessary to re-initialize the controller, sync up with a firmware power up procedure and, if needed due to a change in the configuration, to re-initialize and spin up disk drives in the array. These problems are multiplied if, as is often the case in larger computer networks, such as Wide Area Networks (WANs) and Local Area Networks (LANs), there are multiple RAID systems each coupled to a different host computer. In this situation the user must load or check to make certain that the firmware upgrade and the necessary utility programs are present on each host computer before beginning the upgrade procedure. Moreover, because the hardware and operating system on each RAID system and its associated host computer can vary due to differences in vendor, model or capacity, the user must check the upgrade to make certain the appropriate device drivers are present. This downtime can have a significant impact when the system is used, for example, in an information server, such as a server on the Internet running 24 hours a day and 7 days a week.

A more significant problem arises in those situations in which no interface between the controller of the RAID system and the host computer is possible. Inability to interface with the controller may be due to problems with the host computer, for example problems with the firmware in the RAID system may prevent loading an operating system for the host computer, or because the necessary utility program for erasing and reprogramming the EEPROM is not available on the host computer. The utility program can be unavailable because the host computer is a "closed system", to which the user is unable or not authorized to load programs, or because the utility program conflicts with the operating system of the host computer.

Accordingly, there is a need for an apparatus and method for upgrading programs in a controller of a memory system without the use of a host computer and without requiring removal of the controller or any components thereof. It is desirable that the method work regardless of the configuration of the memory system and the vendor or model of the components thereof. It is also desirable that data stored in the array remain available to the host computer during the upgrading process.

The present invention provides a solution to these and other problems, and offers other advantages over the prior art.

SUMMARY OF THE INVENTION

The present invention relates to a method and apparatus for dynamically creating an executable image from an Object File Format (OFF) file, such as a Common Object File Format (COFF) or an Executable and Linking Format (ELF) file, stored in a reserved area of one of a number of data storage devices in memory system.

According to one embodiment, a controller is provided coupled to the storage devices. The controller has a Programable Read Only Memory (PROM) or equivalent programable memory in which an initial boot sequence is stored, a Random Access Memory (RAM) in which the executable image is assembled and a Central Processing Unit (CPU) or other processor capable of performing a hardware discovery sequence, reading data from the OFF file, assembling the executable image in RAM and executing the executable image. Generally, the PROM further includes a computer program that enables the CPU to translate the data from the OFF file into the executable image. In one embodiment, the PROM is an Electronically Erasable PROM (EEPROM), the executable image is a firmware boot image, and the CPU is capable of erasing the initial boot sequence from the EEPROM and storing the assembled executable image in the EEPROM. In another embodiment, the data storage devices are disk drives in a Redundant Array of Independent Disks (RAID) system, and the OFF file is provided by replacing a hot spare disk drive with an upgrade disk drive having a reserved area with the OFF file stored therein. The memory system of the present invention is particularly advantageous for use in computer networks having a host computer capable of writing data to and reading data from the memory system and a bus coupling the host computer to the controller of the memory system. While the invention provides significant advantages for RAID type devices, it will be appreciated that the method and the device may be broadly applied to dynamic firmware image creation generally and is not limited to such memory storage systems environments or applications.

In another aspect, the present invention is directed to a method of operating a memory system to create an executable image from data in an OFF file. In the method, at least one of a number of data storage devices is provided with a reserved area having the OFF file stored therein. A controller is coupled to the data storage devices, the controller having a PROM, a RAM and a CPU. The memory system is initialized, data read from the OFF file to create the executable image and the executable image assembled in RAM. Typically, the PROM has an initial boot sequence is stored therein, and the step of initializing the memory system involves the CPU executing the initial boot sequence. Preferably, initializing the memory system includes performing a hardware discovery sequence on the memory system, and the step of reading data from the OFF file involves reading data related to hardware discovered. Optionally, when the data storage devices are disk drives in a RAID system, the step of initializing the memory system also includes the step of discovering the configuration or RAID level of the RAID system. In one embodiment, the PROM further includes computer programs that enable the CPU to translate the data stored in the OFF file from an object format into an executable format compatible with the PROM and to link the data to assemble an executable image, and the step of creating an executable image includes the steps of translating data read from the OFF file and linking the data to assemble the executable image. In another embodiment, the PROM is an Electronically Erasable PROM (EEPROM), and the method includes the further steps of erasing the initial boot sequence from the EEPROM, and storing the assembled executable image in the EEPROM. Frequently, data storage devices are disk drives in a RAID system, and the step of providing a disk drive having a reserved area with the OFF file stored therein involves replacing a hot spare disk drive in the RAID system with an upgrade disk drive having the reserved area. The method may desirably further includes the step of removing the upgrade disk drive with the reserved area and replacing the hot spare disk drive when creation of the executable image is complete.

In yet another aspect, the present invention is directed to a memory system having means for creating an executable firmware image and storing the executable firmware image in the PROM, thereby replacing the initial boot sequence. As in the embodiments described above, the data storage devices include at least one data storage device having a reserved area with an OFF file stored therein, and the means for creating an executable firmware image includes a computer program that enables the CPU to translate the data stored in the OFF file from an object format into an executable format compatible with the PROM and assemble the executable firmware image in RAM. Preferably, the data storage devices are disk drives in a RAID system, and the data storage device having the reserved area is an upgrade disk drive installed in place of a hot spare disk drive in the RAID system.

In still another aspect, the present invention is directed to a computer program product for use in conjunction with a computer system. The computer program product includes a computer readable storage medium having a computer program mechanism embedded therein. The computer program mechanism includes a program module that directs a controller having a Programable Read Only Memory (PROM), Random Access Memory (RAM) and a Central Processing Unit (CPU), to create an executable image from data in an Object File Format (OFF) file stored in a reserved area of one of a plurality of data storage devices. The program module includes program code or instructions for: (i) coupling the controller to the plurality of data storage devices; (ii) initializing the controller; (iii) reading data from the OFF file; and (iv) assembling the executable image in RAM.

BRIEF DESCRIPTION OF THE DRAWINGS

These and various other features and advantages of the present invention will be apparent upon reading of the following detailed description in conjunction with the accompanying drawings, where.

DETAILED DESCRIPTION OF THE INVENTION

A method and apparatus are provided for dynamically creating an executable image from an object file format or OFF file stored in a reserved area of one of a number of data storage devices in memory system. An OFF file is a file containing executable object code and/or data generated by a compiler or an assembler from the source code of a program, and is portable across platforms. Common formats include Common Object File Format (COFF) or an Executable and Linking Format (ELF) file. It is to be understood that by OFF file it is meant any computer readable data structure in which data is stored in an object format suitable for linking with other object files to create an executable shared object file or image.

Figure 1:
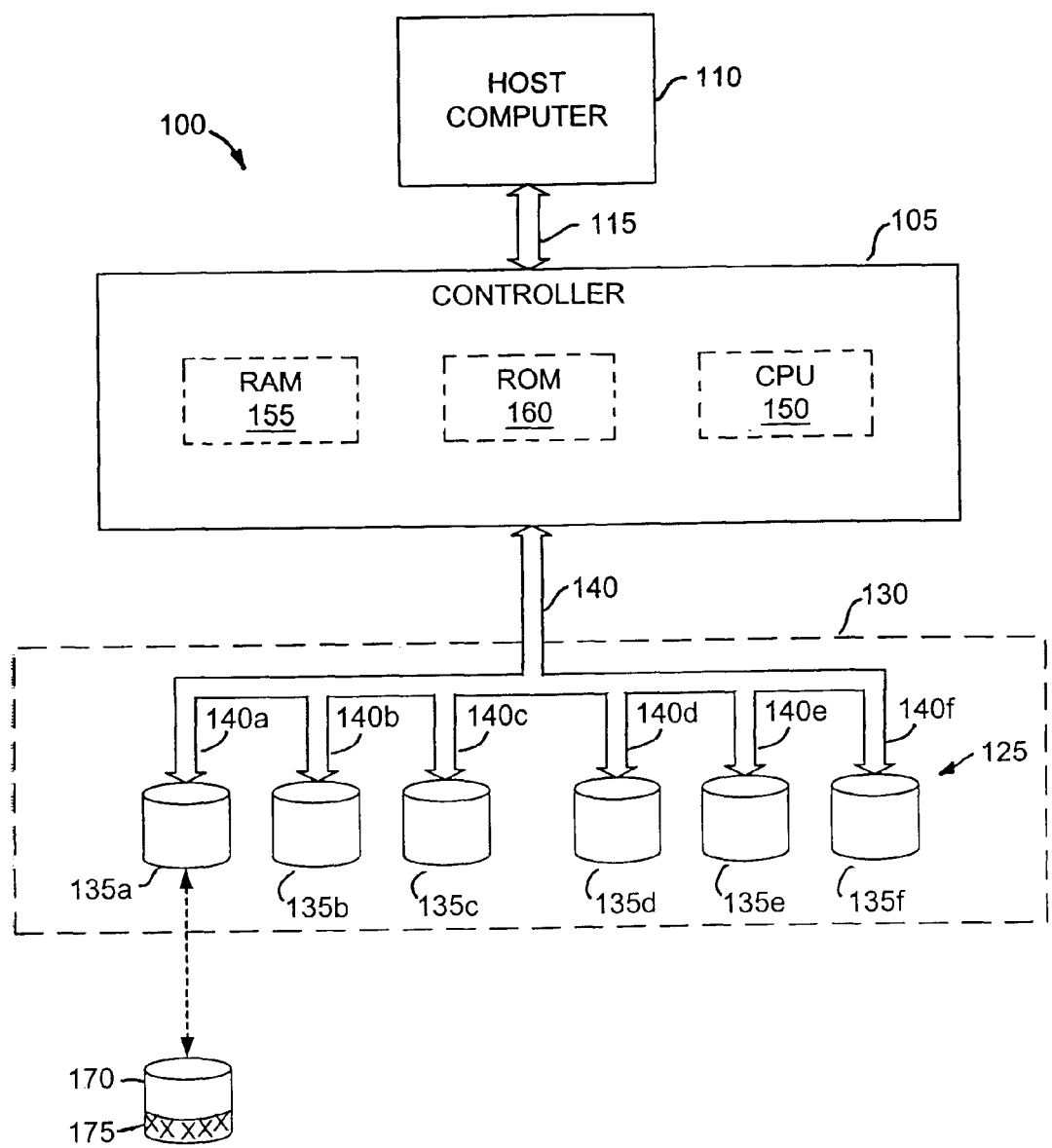
FIG. 1 is a block diagram of an embodiment of a computer network having a memory system according to an embodiment of the present invention.

FIG. 1 shows a block diagram of an exemplary embodiment of a memory system 100 according to the present invention having a controller 105 coupled to a host computer 110 through a host-side bus 115 or other communication channel. It is to be understood that by host-side bus 115 it is meant a communication path that connects the controller 105 to the host computer 110, and that the host-side bus can also connect other devices or systems (not shown) to the host computer or the memory system 100. The controller 105 in turn is coupled to one or more data storage devices 125, shown here as a RAID system 130 comprising multiple disk drives 135, via device-side buses 140 (singularly 140a to 140f)), such as Small Computer System Interface (SCSI) buses, also known as disk channels. Alternatively, the controller 105 could also be coupled to the data storage devices 125 via several fiber channel loops (not shown), as described in commonly assigned co-pending U.S. patent application Ser. No. 09/429,523, which is hereby incorporated by reference. Also although FIG. 1 shows a single controller 105 coupled by SCSI buses 140 to a RAID system 130 comprising only six disk drives 135, the illustrated architecture is extendable to memory systems 100 having any number of controllers, disk drives, and device-side buses or loops. For example, the memory system 100 can include a number, n, of n-way controllers 105 using operational primitives in a message passing multi-controller non-uniform workload environment, as described in commonly assigned co-pending U.S. patent application Ser. No. 09/326,497, which is hereby incorporated by reference.

The controller 105 includes a Processor or a Central Processing Unit (CPU) 150, a Random Access Memory (RAM) 155 and a Programable Read Only Memory (PROM) 160. The CPU 150 can include one or more Reduced Instruction Set Computing (RISC) processors or a Complex Instruction Set Computing (CISC) processor. The CPU 150 performs the basic instructions to operate the memory system 100 and, in accordance with the present invention, performs a hardware discovery sequence on the memory system, reads data from the OFF file, assembles the executable image in RAM 155 and executes the executable image. The RAM 155 is a readable and writable temporary memory normally used to speed up transfer of data to and from the data storage devices 125 by acting as a buffer to match the data transfer rate of the data storage devices with that of the host computer 110. There are several types of RAM 155 that can be used including but not limited to, dynamic RAM (DRAM), synchronous DRAM (SDRAM), extended data out DRAM (EDO DRAM), and static RAM (SRAM). In addition, in accordance with the present invention, the RAM 155 also serves as a location in which the executable image can be assembled, and from which it can be executed by the CPU 150. The controller 105 typically has from about 32 to about 512 megabytes (Mbytes) of RAM 155. The PROM 160 is a non-volatile memory in which an initial boot sequence (not shown) is stored that initializes and provides operating instructions for the controller 105 and the rest of the memory system 100. In accordance with the present invention, the PROM 160 further includes computer programs (not shown), known as utility programs, that enable the CPU 150 to translate the data in the OFF file from an object format into an executable format compatible storage in the PROM (a rommer utility), and a utility able to parse a linker directive file (a linker utility), also stored in the reserved area, and which was used to create the OFF file to locate particular data within the OFF file. The linker directive file comprises scripting commands to the rommer utility regarding which data sections to read from the OFF file and which address to copy the data to in RAM in order to create an executable image. In a preferred embodiment, the PROM 160 is an Electronically Erasable PROM (EEPROM), also know as a Flash EPROM, that can be erased and reprogrammed thereby replacing the original initial boot sequence with an executable firmware image created from data in the OFF file. The controller also has various other hardware components known in the art but not shown in the embodiment of FIG. 1 or described herein for the sake of simplicity of description, and so as not to obscure the invention. These components include, for example, Battery Back-up Units (BBU) to preserve data in RAM in the event of a power failure, SCSI and Fibre chips to support communication with the host computer and/or RAID system, and serial and parallel ports.

The RAID system 130 can be configured to operate at any of several different RAID levels, as described above, depending on the level of data transfer rate, type of transactions expected, capacity or redundancy required and the like. Preferably, at least one of the disk drives 135 is an installed spare disk drive 135a in hot standby and which, in accordance with the present invention, can be hot swapped with an upgrade disk drive 170 having a reserved area 175 with the OFF file stored therein while the RAID system 130 is performing its normal functions. That is, while input/output (I/O) transactions involving other disk drives 135b to 135f, are occurring over the SCSI buses 140. The upgrade disk drive 170 can be any suitable disk drive produced by any vendor that has sufficient capacity to store the OFF file and other computer data, programs and instructions necessary for the process of the present invention, and which has connectors and an operating system compatible with the device side bus 140 and the controller 105 of the RAID system 130. For example, when the controller 150 is an AcceleRAID™ series, an eXetremeRAID™ series or a DAC series controller, all commercially available from Mylex, Inc., Boulder, Colo., the upgrade disk drive 170 can be any disk drive having a capacity of at least 16 Mbytes, and commercially available from disk drive manufacturers such as for example Seagate, Quantum and Western Digital. Optionally, the upgrade disk drive 170 can further include an indication mechanism such as a Light-Emitting Diode (LED) (not shown) or an audible alarm (not shown) that can be employed to signal a user when downloading from the upgrade disk to the memory system 100 is in progress or is complete.

Figure 2:
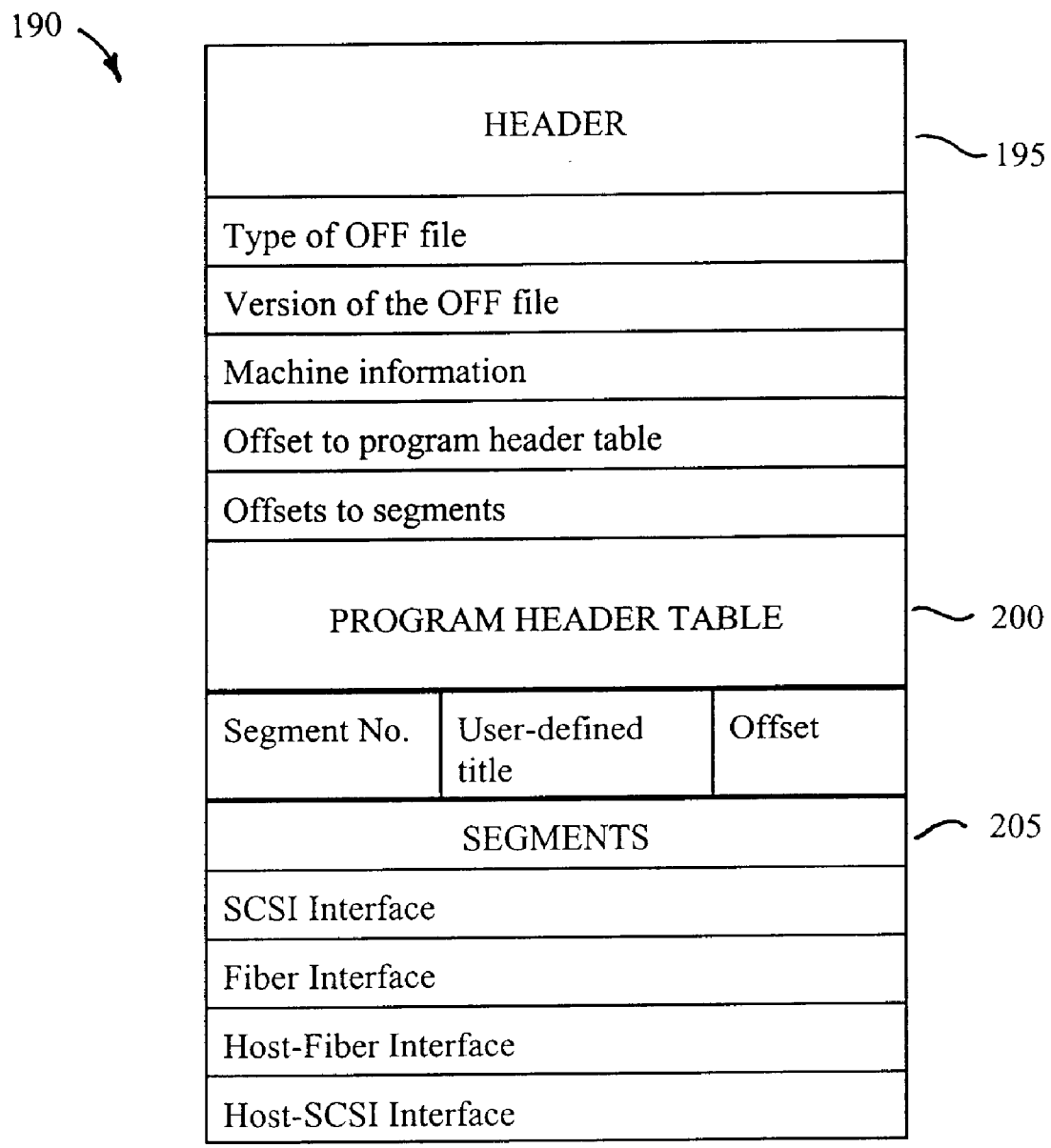
FIG. 2. is a schematic diagram illustrating schema of an Object File Format (OFF) file according to an embodiment of the present invention.

Referring to FIG. 2, a suitable schema 190 or structure of an OFF file for practicing the method of the present invention will now be described. The OFF file typically includes a header 195, a program header table 200 and a number of segments 205 containing the actual object files. The header 195 identifies the particular type of OFF file, i.e. a COFF file or a ELF file, and in addition may include information on the version of the OFF file, information on the machine (that is the disk drive or platform on which the OFF file resides) and offsets to other portions the OFF file, such as the program header table 200 and the segments 205. The program header table 200 is an index that typically identifies the segments 205 both by segment number and by a user-defined title, and which provides offsets to enable utility programs, such as the linker utility, to locate specific segments containing desired object files. A key advantage of the OFF is that the program header table 200 allows the object files in the segments 205 to be dynamically loaded and linked. A further advantage of the OFF is that it allows system-dependent information to be added to the object files without causing the utility programs and/or the initial boot sequence to become obsolete. This in turn allows a single upgrade disk drive 170 to be used to create executable images for different memory systems 100 having different hardware components and operating in different RAID configurations. The segment titles are entered as ASCII strings, and typically include titles describing various possible hardware configurations of the memory system 100. For example, the segment title can include names such as SCSI Interface, Fiber Interface, Host-Fiber Interface and Host-SCSI Interface.

Figure 3:
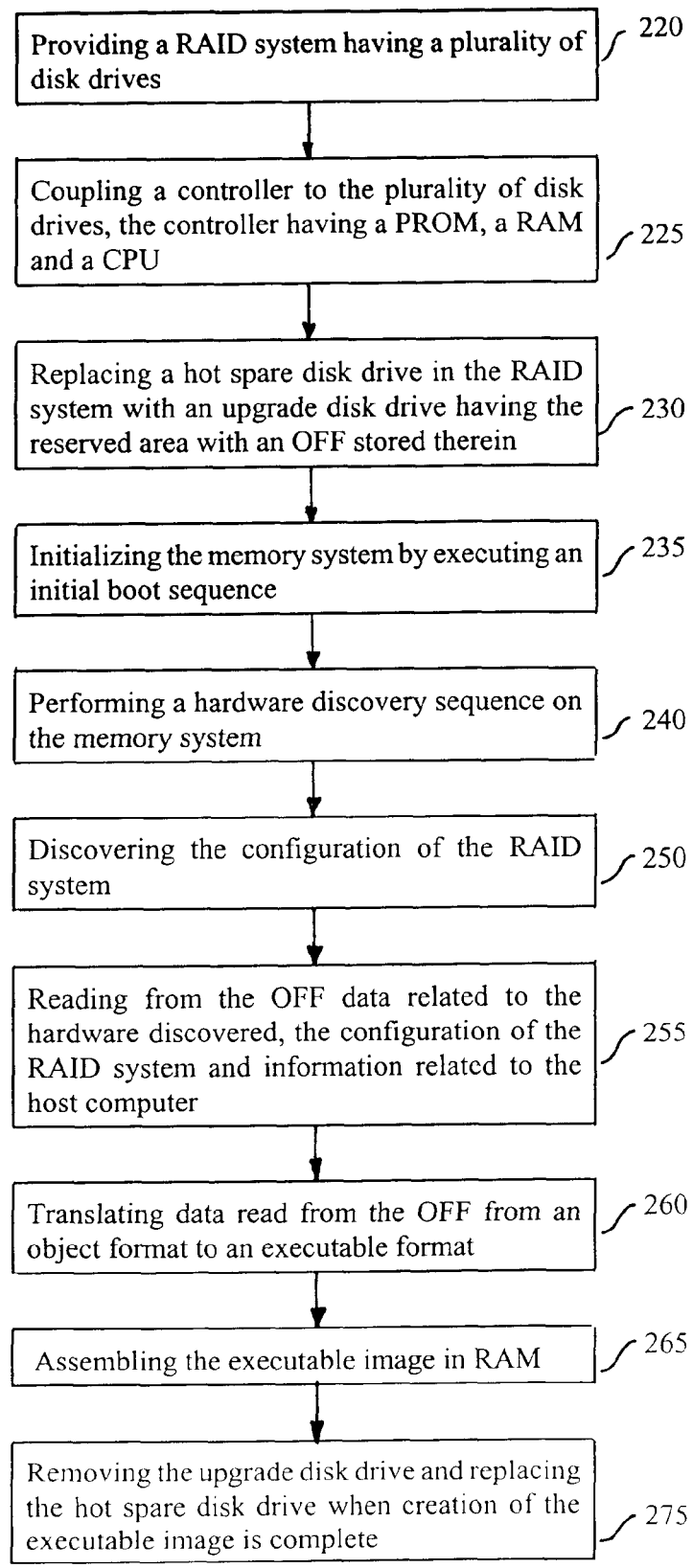
FIG. 3 is a flow chart illustrating a method of operating a memory system to create an executable image according to an embodiment of the present invention.

An exemplary method of operating the memory system 100 shown in FIG. 1 to dynamically create an executable image from an OFF file stored in the reserved area 175 of one of several data storage devices 125 in memory system, will now be described with reference to FIG. 3. The following initial actions or steps are required to create an executable image from the OFF file. First, a memory system 100 having several data storage devices 125, such as a RAID system 130 including a number of disk drives 135, is provided (step 220). Next, a controller 150 having a PROM 160, a RAM 155 and a CPU 150 is coupled to the data storage devices 125 (step 225). An installed spare data storage device, such as the hot spare disk drive 135a in the RAID system 130 shown in FIG. 1, is removed and replaced with the upgrade disk drive 170 having the reserved area 175 with the OFF file stored therein (step 230). The memory system 100 is then initialized in a system initialization step (step 235). The initialization step can be prompted by a RESET command entered by a user, or automatically by the controller 105 itself following a determination step (not shown) in which the controller sensing removal of the hot spare disk drive 135a, queries the recently installed disk drive and determines it is an upgrade disk drive 170. The initialization step typically includes performing a hardware discovery sequence on the memory system 100 (step 240), and may include discovering the configuration of the RAID system 130 and information concerning the host computer 110 or platform (step 250). Data related to the hardware discovered and information related to the host computer 110 and the configuration of the RAID system 130 is then read from the OFF file (step 255). Generally, this step involves the use of the linker utility to parse a linker directive file on the upgrade disk drive 170 that was used to create the OFF file. The linker directive file instructs the linker utility as to where data sections will reside in the OFF file. As the data is read from the OFF file, it is translated from an object format to an executable format compatible storage in the PROM 160 by the CPU 150 using the rommer utility. (step 260). After the appropriate data is read from the OFF file, the executable image is assembled in the correct location of the RAM 155. (step 265). As noted above, the completion of this step can be signified by an audible or visual alarm, such as a LED. The upgrade disk drive 170 may then be removed and replaced with the hot spare disk drive 135a (step 275), and the CPU 150 instructed to resume execution from the new location of the just created executable image in RAM 155 (step not shown). Optionally, if the executable image is an executable firmware image intended to replace the initial boot sequence stored in the PROM 160, the method may include the further steps (not shown) of sending an electronic signal to erase the program code in the PROM and copying the program code of the executable firmware image from the RAM 155 to the PROM.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method of operating a RAID controller, said RAID controller including a RAM, said controller including a PROM containing an initial boot sequence, said method comprising the steps of:

installing in a disk drive data storage device including a reserved area with an OFF file, the RAID controller controlling said disk drive; and said controller discovering hardware and a configuration of said controller and then reading data from said OFF file pertaining to said hardware and configuration;

said controller translating said data, read from said OFF file, from an object format to an executable format compatible with said PROM;

said controller assembling in said RAM an executable image of a program in said OFF file based on said data read from said OFF file; and said controller executing the assembled executable image from said RAM.

2. A method according to claim 1, wherein said program is a new or updated initial boot sequence.

3. A method according to claim 2, further comprising the step of copying said executable image of said program from said RAM into said PROM replacing or updating the first said intial boot sequence.

4. A method according to claim 1, wherein said RAID controller also controls a plurality of other data storage devices.

* * * * *